US008527618B1

(12) United States Patent
Wiese

(10) Patent No.: US 8,527,618 B1
(45) Date of Patent: Sep. 3, 2013

(54) REPERCUSSIONLESS EPHEMERAL AGENT FOR SCALABLE PARALLEL OPERATION OF DISTRIBUTED COMPUTERS

(75) Inventor: James Christopher Wiese, Dublin, CA (US)

(73) Assignee: EMC Corporation, Hopkinton, MA (US)

( * ) Notice: Subject to any disclaimer, the term of this patent is extended or adjusted under 35 U.S.C. 154(b) by 1340 days.

(21) Appl. No.: 11/608,240

(22) Filed: Dec. 7, 2006

Related U.S. Application Data

(63) Continuation-in-part of application No. 10/949,539, filed on Sep. 24, 2004, now Pat. No. 7,516,492, and a continuation-in-part of application No. 10/949,545, filed on Sep. 24, 2004, now Pat. No. 7,523,301, and a continuation-in-part of application No. 10/949,552, filed on Sep. 24, 2004.

(60) Provisional application No. 60/748,531, filed on Dec. 8, 2005.

(51) Int. Cl.
*G06F 15/173* (2006.01)

(52) U.S. Cl.
USPC ........... 709/223; 709/217; 709/219; 717/168; 717/172; 717/177

(58) Field of Classification Search
USPC .......... 709/202, 217–219, 223; 717/168–178
See application file for complete search history.

(56) References Cited

U.S. PATENT DOCUMENTS

| 6,360,279 | B1 * | 3/2002 | Woods et al. ................. 719/318 |
| 2002/0004815 | A1 * | 1/2002 | Muhlestein et al. .......... 709/201 |
| 2002/0100036 | A1 * | 7/2002 | Moshir et al. ................. 717/173 |
| 2003/0023728 | A1 | 1/2003 | Yaung |
| 2003/0084134 | A1 * | 5/2003 | Pace et al. ..................... 709/223 |
| 2004/0255161 | A1 | 12/2004 | Cavanaugh |
| 2005/0267915 | A1 | 12/2005 | Zhulong et al. |
| 2007/0203938 | A1 | 8/2007 | Prahlad et al. |
| 2008/0005624 | A1 | 1/2008 | Kakivaya et al. |
| 2009/0193113 | A1 | 7/2009 | Lunde |

OTHER PUBLICATIONS

Jim Wiese, "Push and run .NET Code on Remote Machine" (main article), Posted Dec. 11, 2004 at http://www.codeproject.com/KB/IP/run_code_remotely.aspx, 10 pgs.

(Continued)

*Primary Examiner* — Ian N Moore
*Assistant Examiner* — Jackie Zuniga
(74) *Attorney, Agent, or Firm* — Patent Ventures: Bennett Smith; Korbin Van Dyke

(57) ABSTRACT

A repercussionless ephemeral agent for scalable parallel operation of distributed computers provides efficient processing on the distributed computers via a bootstrapped agent and on-demand downloading of software components. Central computers having access to script, bootstrap, and library software code as well as a database, activate remote execution of the script on the distributed computers to control the distributed computers. The distributed computers are optionally controlled to perform an analysis according to the script in a distributed fashion with a high degree of parallelism. The analysis optionally examines all or portions of files implemented on or accessible to the distributed computers without the necessity of transferring the files from the distributed computers to the central machines. When the bootstrapped agent completes processing, all processes and files associated with the agent are removed from the distributed computers, effectively eliminating all traces of the execution from the distributed computers.

32 Claims, 2 Drawing Sheets

(56) References Cited

OTHER PUBLICATIONS

Reader Commentary to "Push and Run .NET Code on Remote Machine", various entries dating from Dec. 12, 2004 through Mar. 26, 2008, available at http://www.codeproject.com/KB/IP/run_code_remotely.aspx?display=PrintAll&fid=134548&df=90&mpp=25&noise=3&sort=Position&view=Quick&fr=1#xx0xx, 20 pgs.

Michel Barnett, ".NET Remoting Authentication and Authorization Sample—Part I", published Jan. 2004, by Microsoft Developer Network (MSDN), at http://msdn.microsoft.com/en-us/library/ms973911.aspx, 21 pgs.

Michel Barnett, ".NET Remoting Authentication and Authorization Sample—Part II", published Jan. 2004, by Microsoft Developer Network (MSDN), at http://msdn.microsoft.com/en-us/library/ms973909.aspx, 32 pgs.

Mark Russinovich, "Sysinternals Freeware—Utilities for Windows NT and Windows 2000—PsExec", by Mark Russinovich, Archived by web.archive.org on Dec 12, 2004 at http://web.archive.org/web/20041212024433/http://www.sysinternals.com/ntw2k/freeware/psexec.shtml, 3 pgs.

Mark Russinovich, "PSExec", Published in the Jul. 2004 edition of Windows IT Pro magazine and online at http://windowsitpro.com/article/articleid/42919/psexec.html, Jun. 29, 2004, 3 pgs.

Jim Wiese, Run_Code_remotely_src top-level directory source files for "Push and Run .NET Code on Remote Machine", Posted Dec. 11, 2004 at http://www.codeproject.com/KB/IP/run_code_remotely.aspx, 2 pgs.

Jim Wiese, CodeProject.Remoting.Common top-level directory source files for "Push and Run .NET Code on Remote Machine", Posted Dec. 11, 2004 at http://www.codeproject.com/KB/IP/run_code_remotely.aspx, 46 pgs.

Jim Wiese, ExecRemote top-level directory source files for "Push and Run .NET Code on Remote Machine", Posted Dec. 11, 2004 at http://www.codeproject.com/KB/IP/run_code_remotely.aspx, 51 pgs.

Jim Wiese, QuickDir top-level directory source files for "Push and Run .NET Code on Remote Machine", Posted Dec. 11, 2004 at http://www.codeproject.com/KB/IP/run_code_remotely.aspx, 26 pgs.

Jim Wiese, Server top-level directory source files for "Push and Run .NET Code on Remote Machine", Posted Dec. 11, 2004 at http://www.codeproject.com/KB/IP/run_code_remotely.aspx, 7 pgs.

Jim Wiese, ServiceOnRemoteMachine top-level directory source files for "Push and Run .NET Code on Remote Machine", Posted Dec. 11, 2004 at http://www.codeproject.com/KB/IP/run_code_remotely.aspx, 40 pgs.

Jim Wiese, WinFormTest top-level directory source files for "Push and Run .NET Code on Remote Machine", Posted Dec. 11, 2004 at http://www.codeproject.com/KB/IP/run_code_remotely.aspx, 11 pgs.

Suzanne Cook, "Suzanne Cook's .NET CLR Notes: Common Language Runtime Developer" (in 2 separately numbers parts), various entries dating from May 29, 2003 through Feb. 11, 2005, published by Microsoft Developer Network (MSDN), at http://blogs.msdn.com/suzcook/Default.aspx, 19 pgs.

List of Art Rejections in Office Actions in Related Case U.S. Appl. No. 12/106,228; 1 pg, Jun. 10, 2010 & Dec. 22, 2010.

* cited by examiner

REPERCUSSIONLESS EPHEMERAL AGENT FOR SCALABLE PARALLEL OPERATION OF DISTRIBUTED COMPUTERS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 60/748,531, filed Dec. 8, 2005, first named inventor James Christopher Wiese, and entitled REPERCUSSIONLESS EPHEMERAL AGENT FOR HIGHLY SCALABLE PARALLEL ANALYSIS OF REMOTE MACHINES;

U.S. Non-Provisional application Ser. No. 10/949,539, filed Sep. 24, 2004, first named inventor James Nisbet, and entitled INFERRING DOCUMENT AND CONTENT SENSITIVITY FROM PUBLIC ACCOUNT ACCESSIBILITY;

U.S. Non-Provisional application Ser. No. 10/949,545, filed Sep. 24, 2004, first named inventor James Nisbet, and entitled INFERRING CONTENT SENSITIVITY FROM PARTIAL CONTENT MATCHING; and U.S. Non-Provisional application Ser. No. 10/949,552, filed Sep. 24, 2004, first named inventor James Nisbet, and entitled PARTIAL DOCUMENT CONTENT MATCHING USING SECTIONAL ANALYSIS;

BACKGROUND

1. Field

Advancements in operating a multiplicity of computers are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Some computer systems are distributed, having a multiplicity of computers and file systems attached to the computers. In some usage scenarios, the file systems store large data sets. Operating the multiplicity of computers is complex, and accessing the large data sets is resource-intensive.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the operations of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of systems, methods, and computer readable mediums in accordance with the concepts taught herein. As is discussed in more detail in the Conclusions, the invention encompasses all possible modifications and variations within the scope of the issued claims.

DETAILED DESCRIPTION

Figure 1:
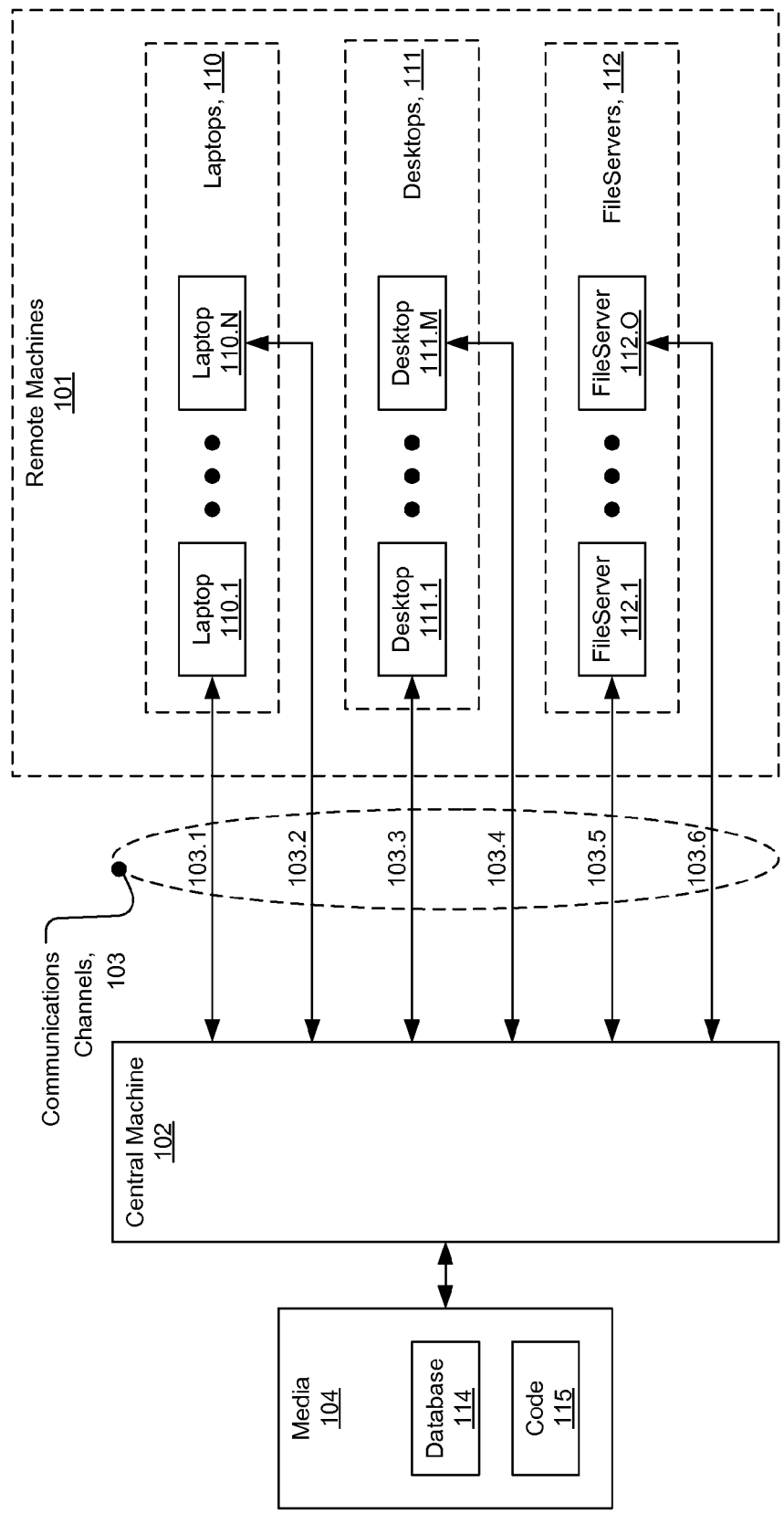
FIG. 1 illustrates selected details of an embodiment of a system for efficiently analyzing a multiplicity of remote machines.

A detailed description of one or more embodiments of the invention is provided below along with accompanying figures that illustrate the principles of the invention. The invention is described in connection with the embodiments. It is well established that it is neither necessary, practical, or possible to exhaustively describe every embodiment of the invention. Thus the embodiments herein are understood to be merely illustrative, the invention is expressly not limited to or by any or all of the embodiments herein, and the invention encompasses numerous alternatives, modifications and equivalents. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets. Wherever multiple embodiments serve to illustrate variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

| Acronym | Description |
| --- | --- |
| API | Application Programming Interface |
| DLL | Dynamically Loaded Library |
| GLBA | Gramm-Leach-Bliley Act |
| GPO | Group Policy Object |
| GUID | Globally Unique IDentifier |
| HIPAA | Health Insurance Portability and Accountability Act of 1996 |
| I/O | Input/Output |
| IT | Information Technology |
| LAN | Local Area Network |
| MAN | Metro Area Network |
| NPI | Non-public Personal Information |
| OS | Operating System |
| PCI | Payment Card Industry |
| PHI | Protected Health Information |
| PII | Personally Identifiable Information |
| RPC | Remote Procedure Call |
| StdErr | Standard Error |
| StdIn | Standard Input |
| StdOut | Standard Output |
| TCP/IP | Transmission Control Protocol/Internet Protocol |
| UNC | Universal Naming Convention |
| WAN | Wide Area Network |
| WMI | Windows Management Instrumentation |

In some embodiments, a repercussionless ephemeral agent for scalable parallel operation of distributed computers provides efficient processing on the distributed computers via bootstrap code and on-demand downloading of software components. Central computers having access to bootstrap and library software code, a script, as well as a database, activate remote execution (via an RPC capability, for example) of the script on the distributed computers to control the distributed computers. The distributed computers are optionally controlled to perform an analysis according to the script in a distributed fashion with a high degree of parallelism. The analysis optionally examines all or portions of files implemented on (such as local to) or accessible to (such as via networking) the distributed computers without the necessity of transferring the files from the distributed computers to the central machines. When the agent completes processing, all processes and files associated with the agent are removed from the distributed computers, effectively eliminating all traces of the execution from the distributed computers.

In some embodiments, the script and all of its byproducts are removed from each of the remote machines as the script and any related processes complete, leaving no trace of the script executing on the remote machine. Another invocation of the script (or an updated version of the script, according to operational requirements) is, in some usage scenarios, performed at a later time, without any assumptions (or requirements) of permanence of state from an earlier invocation of the script, as necessary information is dynamically provided as needed.

Each remote machine executes the script, and in response optionally downloads missing or out-of-date software components and then calls back for and receives from the central machine the bootstrap. During execution of the bootstrap by each remote machine, one or more library code or data components referred to by the bootstrap are, in some usage scenarios, determined to be missing. The missing components are requested from and provided by the central machine. Each remote machine hosts an instance of the bootstrapped analysis agent. Results produced by each remote machine are combined and processed by the central machine to update the database. When the bootstrapped analysis agent completes processing on each remote machine, all processes and files associated with the agent are removed from the respective remote machine, effectively eliminating all traces of the execution of the bootstrapped analysis agent. The agent is optionally operated as a background task using otherwise unused resources to reduce visible performance impact while the agent is executing.

In some embodiments, the script has an embedded executable binary that is operable as the bootstrap, and at least the initial call back is optionally omitted. The embedded executable binary is echoed, by the script, for execution on the remote machine. The execution of the embedded executable binary results in the remote machine opening a socket to facilitate a connection with the central machine. In some embodiments, the remote machine listens for a connection initiated by the central machine. In other embodiments, the central machine listens for a connection imitated by the remote machine. Optionally, additional information is subsequently exchanged between the central and the remote machines via the connection.

In some embodiments, the script is entirely self-contained, having an embedded executable binary and one or more objects (such as the library or the data components). One or more of the call back and the requests for missing components are optionally omitted.

The remote machines are any combination of laptops, desktops, file servers, work stations, and any other similar computing element. Configuration of the remote machines for proper execution of the bootstrapped analysis agent is limited to enabling the receiving and the executing of the script, eliminating any need for special management or installation of software on the remote machines by IT personnel. In some usage scenarios, enabling the remote machines for usual enterprise network data sharing also enables the remote machines for download and/or execution of the script. For example, granting access to a Windows domain to a machine is, in some usage scenarios, conditional upon the machine having a properly setup and configured service creation function (such as a CreateService API in a Win32 or Win64 context) enabled for remote access. Joining a Windows domain is, in some usage scenarios, conditional upon the machine having the properly setup and configured create service function enabled for remote access. Thus the machine is guaranteed to be operable as a remote machine if it is in the domain. In various embodiments, the granting, the joining, or both establishes a trust relationship between a process requestor (having administrator privileges) and the machine joining the domain, such that the machine is operable as a remote machine by the requestor. In some embodiments, the remote machine is operable at the same privilege level as the requestor (such as an administrator privilege level).

The execution of the bootstrapped analysis agent, in some usage scenarios, performs content analysis on files stored on file systems implemented on a disk local to the respective remote machine or mounted for networked access by the respective remote machine. The aforementioned requesting of the missing data components dynamically provides portions of the database from the central machine for use as needed by the content analysis executing on the respective remote machine. For example, in some usage scenarios, the database has data related to identifying or classifying information in the files according to a variety of content categories.

For another example, in some usage scenarios, the database has data related to a previous classifying of the information in the files and arranged in the database according to the respective remote machine. In some embodiments, a file or a collection of files organized according to any convenient access mechanism, are used instead of or in addition to a database.

In some embodiments, the content analysis performed by the agents in the remote machines is in accordance with the content analysis techniques described in U.S. Non-Provisional application Ser. No. 10/949,539, filed Sep. 24, 2004, first named inventor James Nisbet, and entitled INFERRING DOCUMENT AND CONTENT SENSITIVITY FROM PUBLIC ACCOUNT ACCESSIBILITY; U.S. Non-Provisional application Ser. No. 10/949,545, filed Sep. 24, 2004, first named inventor James Nisbet, and entitled INFERRING CONTENT SENSITIVITY FROM PARTIAL CONTENT MATCHING; and U.S. Non-Provisional application Ser. No. 10/949,552, filed Sep. 24, 2004, first named inventor James Nisbet, and entitled PARTIAL DOCUMENT CONTENT MATCHING USING SECTIONAL ANALYSIS. For example, in some embodiments, the central machine database defines content classifications and/or categories associated with the content analysis techniques. In some embodiments, the central machine database has all or portions of the repositories associated with the content analysis techniques. In some usage scenarios, while it is desirable to determine if particular content of interest in one or more of the categories resides on the remote machines, it is not desirable to distribute the particular content as part of the analysis. In these scenarios, the repositories store keys that are results of linguistic content analysis, of the particular content. The keys are safe to distribute in the clear to the remote machine as they are created via techniques that enable the content analysis agents on the remote machines to use the keys to ascertain if the particular content is in the files accessible to the remote machine while not enabling determination of the particular content from the keys alone. More generally, any combination of the content analysis techniques of the above cited applications are envisioned as being used by the agents of the remote machines, in various embodiments and usage scenarios.

The content analysis is optionally targeted to discover or categorize information in the files according to sensitive content such as information required to be specially managed according to governmental regulation (GLBA, HIPAA, and PHI), financial information such as credit card data (according to PCI), and other personal and health information (such as PII and NPI).

Sensitive content discovered on a remote machine is optionally made inaccessible to the remote machine (via moving, removing, or quarantining, for example). Appropriate notification of the existence and location of the sensitive content is optionally provided to personnel responsible for sensitive content management.

Example Embodiments

In concluding the introduction to the detailed description, what follows is a collection of example embodiments, in accordance with the concepts taught herein; these examples are not meant to be mutually exclusive, exhaustive, or restrictive; and the invention is not limited to these example embodiments but rather encompasses all possible modifications and variations within the scope of the issued claims.

A first embodiment of a method comprising spawning a remote process; providing an executable text to the remote process; providing an executable program to the remote process; and receiving output from the remote process.

The first embodiment, wherein the executable program is referred to by the executable text. The aforementioned embodiment, wherein the providing of the executable program is in response to a call back from the remote process. The aforementioned embodiment, wherein the remote process is executed on a slave computer. The aforementioned embodiment, wherein the spawning is under direction of a master computer.

The first embodiment, further comprising communicating with the remote process via at least one of StdOut, StdIn, StdErr, and an RPC mechanism such as .NET RPC.

The first embodiment, wherein the remote process is executed on a remote computer. The aforementioned embodiment, wherein the spawning is controlled by a central computer. The aforementioned embodiment, wherein the acts of providing are via the central computer. The aforementioned embodiment, wherein the receiving is via the central computer.

The first embodiment, wherein the executable text is an executable script. The aforementioned embodiment, wherein the executable script is compatible with a create service function. The aforementioned embodiment, wherein the create service function is compatible with at least one of a Win32 CreateService function and a Win64 CreateService function. The first embodiment, wherein the executable script is compatible with a WMI function enabled to accept a script for execution. The first embodiment, wherein the executable text is compatible with cscript.exe of a Windows-compatible OS. The aforementioned embodiment, wherein the Windows-compatible OS is at least one of a Win32 OS and a Win64 OS. The first embodiment, wherein the executable text is compatible with Jscript. The first embodiment, wherein the executable text is compatible with a VBScript engine. The first embodiment, wherein the executable program is compatible with a .NET framework. The first embodiment, wherein the executable program is a binary executable file or loadable library. The aforementioned embodiment, wherein the binary executable is compiled from source code. The aforementioned embodiment, wherein the source code is compatible with at least one of a "C" programming language, a "C#" programming language, a "C++" programming language, and any other high-level programming language.

The first embodiment, wherein the executable text is an executable script having an embedded executable binary. The aforementioned embodiment, wherein the executable script is constructed to echo the embedded executable binary for execution. The aforementioned embodiment, further comprising executing the embedded executable binary. The aforementioned embodiment, wherein the executing opens a socket to communicate with a central computer. The aforementioned embodiment, further comprising, connecting with the central computer via the socket.

The first embodiment, wherein the executable text is an executable script having an embedded executable binary and one or more objects referred to by the embedded executable binary.

The first embodiment, wherein the executable text is an executable script having an embedded executable binary compiled from source code. The aforementioned embodiment, wherein the source code is compatible with at least one of a "C" programming language, a "C#" programming language, a "C++" programming language, and any other high-level programming language.

The first embodiment, wherein the executable program includes an analysis program. The aforementioned embodiment, wherein the analysis program includes a content analysis program. The aforementioned embodiment, wherein the content analysis program is capable of content categorization of information in files accessible by the remote process. The aforementioned embodiment, wherein the files accessible by the remote process include any combination of files on a storage media local to the remote process and a networked storage media accessible via networking from the remote process. The aforementioned embodiment, wherein the content categorization is according to at least one of a personal information category, a financial information category, a public information category, a private information category, a proprietary information category, a sensitive information category, and a government regulated information category. The aforementioned embodiment, wherein the output includes at least a portion of results of the content categorization.

A second embodiment comprising the first embodiment and further comprising responding to a request from the remote process. The second embodiment, wherein the responding includes providing a software element referred to by the executable text. The aforementioned embodiment, wherein the software element is compatible with a .NET framework or other valid binary executable. The second embodiment, wherein the responding includes providing a software element referred to by the executable program or the valid binary executable. The aforementioned embodiment, wherein the software element includes an executable object module. The aforementioned embodiment, wherein the software element includes a data module. The aforementioned embodiment, wherein the data module includes initialization information usable by the executable object module. The aforementioned embodiment, wherein the executable object module is enabled to categorize content of files accessible via the remote process. The aforementioned embodiment, wherein the data module includes a portion of results generated by a previous execution of the executable object module. The aforementioned embodiment, wherein the remote process is executed on a remote computer. The aforementioned embodiment, wherein the previous execution was on at least one of the remote computer and another remote computer.

A third embodiment of a method comprising accessing an executable script; starting a plurality of remote processes on a corresponding plurality of remote computers; providing each of the remote processes with the executable script; providing each of the remote processes with executable code; and processing output from each of the remote processes.

The third embodiment, wherein the executable code is referred to by the executable script. The aforementioned embodiment, wherein the providing of the executable code is in response to call backs from the remote processes.

The third embodiment, wherein the executable code is specified by the executable script. The aforementioned embodiment, wherein the providing of the executable code is in response to call backs from the remote processes.

The third embodiment, wherein the starting is controlled by a master computer and the remote processes are slave processes. The third embodiment, wherein the starting is controlled by a plurality of master computers and the remote processes are slave processes.

The third embodiment, wherein the starting is controlled by a central computer. The aforementioned embodiment, wherein the acts of providing are via the central computer. The aforementioned embodiment, wherein the processing is via the central computer. The aforementioned embodiment, further comprising the central computer communicating with the remote computers via TCP/IP.

The third embodiment, wherein the executable script is compatible with at least one of a Windows compatible create service function, a Win32 CreateService function, a Win64 CreateService function, cscript.exe of a Win32 OS, cscript.exe of a Win64 OS, a WMI function enabled to execute a script, VBScript, Jscript, a binary executable or loadable library, and a DLL.

The third embodiment, further comprising receiving a request for a first software module from a first one of the remote processes and providing the first software module thereto; and receiving a request for a second software module from a second one of the remote processes and providing the second software module thereto.

The third embodiment, further comprising receiving a request for a first data module from a first one of the remote processes and providing the first data module thereto; and receiving a request for a second data module from a second one of the remote processes and providing the second data module thereto.

The third embodiment, wherein the executable code specifies a content analysis to be performed on respective file systems attached to the respective remote computer. The aforementioned embodiment, wherein the respective file systems include at least one of a local file system implemented in a local storage media and a networked file system implemented via networked accessibility. The aforementioned embodiment, wherein the processing includes combining results of the content analyses. The aforementioned embodiment, wherein the processing includes at least one of moving, removing, and quarantining a file implemented within one of the respective file systems. The aforementioned embodiment, wherein the content analysis includes determining a category to associate files of the one of the respective file systems with. The aforementioned embodiment, wherein the category is at least one of a personal information category, a financial information category, a public information category, a private information category, a proprietary information category, a sensitive information category, and a government regulated information category.

A fourth embodiment of a method comprising receiving, from a requestor, a remote request including a script and starting a process in response thereto; executing the script under control of the process; downloading an object program specified by the script; executing the object program under control of the process; and returning, to the requestor, results produced by the executing of the object program.

The fourth embodiment, further comprising destroying the process. The aforementioned embodiment, further comprising removing at least one file created by the process. The aforementioned embodiment, further comprising removing all files created by the process.

The fourth embodiment, wherein the downloading includes a call back to the requestor. The aforementioned embodiment, wherein the requestor is a central computer.

The fourth embodiment, wherein at least one of the acts of receiving, downloading, and executing are via at least one of a laptop computer, a desktop computer, a file server computer, and a workstation computer.

The fourth embodiment, further comprising the process communicating with the requestor via at least one of StdOut, StdIn, and StdErr. The fourth embodiment, further comprising the process communicating with the requestor via an RPC mechanism. The aforementioned embodiment, wherein the RPC mechanism is compatible with TCP/IP.

The fourth embodiment, wherein the process is a result of a create service function. The aforementioned embodiment, wherein the create service function is a Windows-compatible create service function. The aforementioned embodiment, wherein the Windows-compatible create service function is at least one of a Win32 CreateService function and a Win64 CreateService function. The fourth embodiment, wherein the process is a result of a WMI script execution function. The fourth embodiment, wherein the process includes operations in accordance with cscript.exe of a Windows-compatible OS. The aforementioned embodiment, wherein the Windows-compatible OS is at least one of a Win32 OS and a Win64 OS. The fourth embodiment, wherein the script is compatible with Jscript. The fourth embodiment, wherein the script is compatible with VBScript. The fourth embodiment, wherein the object program is compatible with a .NET framework.

The fourth embodiment, wherein the object program includes an analysis function. The aforementioned embodiment, wherein the analysis function is capable of content categorization of information in files accessible via the process. The aforementioned embodiment, wherein the files accessible via the process are at least one of locally accessible and networked accessible. The aforementioned embodiment, wherein the content categorization is according to at least one of a personal information category, a financial information category, a public information category, a private information category, a proprietary information category, a sensitive information category, and a government regulated information category. The aforementioned embodiment, wherein at least a portion of the results are in accordance with the content categorization. The aforementioned embodiment, further comprising requesting a data element required by the executing the object program. The aforementioned embodiment, wherein the data element includes at least a portion in accordance with the content categorization.

The fourth embodiment, further comprising requesting a software element needed to execute at least one of the script and the object program. The aforementioned embodiment, wherein the requesting is in accordance with an AppDomain_AssemblyUnresolved event handler. The aforementioned embodiment, wherein the software element is compatible with a .NET framework.

The fourth embodiment, wherein the process is a controlling process and includes a parent process. The aforementioned embodiment, wherein the process further includes a child process. The aforementioned embodiment, wherein the child process is in accordance with an AppDomain_AssemblyUnresolved event handler. The aforementioned embodiment, further comprising terminating the child process. The aforementioned embodiment, further comprising terminating the parent process. The aforementioned embodiment, further comprising terminating the controlling process.

The fourth embodiment, wherein at least one of the executing of the script and the executing of the object program is subject to resource availability. The aforementioned embodiment, wherein the resource availability accounts for at least one of idle processor cycles and unused I/O bandwidth. The fourth embodiment, further comprising adjusting downward an execution priority level of at least one of the script and the object program when at least one of processor cycles and I/O bandwidth are relatively unavailable. The fourth embodiment, further comprising adjusting upward an execution priority level of at least one of the script and the object program when at least one of processor cycles and I/O bandwidth are relatively available.

The fourth embodiment, wherein at least one of the executing of the script and the executing of the object program is at a relatively high privilege level. The fourth embodiment, wherein at least one of the executing of the script and the executing of the object program is at an administrator privilege level.

A fifth embodiment of a method comprising receiving, from a requestor, a remote request including an executable text and starting a process in response thereto; executing the executable text under control of the process; and returning, to the requestor, results produced by the executing of the executable text. The aforementioned embodiment, wherein members of at least one Windows domain perform the receiving, and at least the requestor is another member of the at least one Windows domain.

The fifth embodiment, wherein the executable text comprises an executable script. The aforementioned embodiment, wherein the executable text has an embedded executable binary that is compatible with echoing by the executable text. The aforementioned embodiment, wherein the executing of the executable text comprises executing the executable binary. The aforementioned embodiment, wherein the executing of the executable script or the executing of the executable binary comprises downloading an object program specified by the executable script or the executable binary.

The fifth embodiment, further comprising destroying the process. The aforementioned embodiment, further comprising removing at least one file created by the process. The aforementioned embodiment, further comprising removing all files created by the process.

A sixth embodiment of a method comprising communicating an executable text to two or more remote processes; and receiving respective output from the remote processes. The aforementioned embodiment, wherein members of at least one Windows domain host the remote processes, and at least one other member of the at least one Windows domain performs the communicating the executable text. The aforementioned embodiment, wherein the executable text comprises an executable script. The aforementioned embodiment, wherein the executable script has or specifies a content analysis program. The aforementioned embodiment, wherein the executable script is compatible with a create service function. The aforementioned embodiment, wherein the create service function is compatible with at least one of a Win32 CreateService function and a Win64 CreateService function. The aforementioned embodiment, further comprising communicating objects in response to object requests from the remote processes.

A seventh embodiment of a system implementing any of the aforementioned method embodiments.

A eighth embodiment of a computer readable medium having a set of instructions stored therein which when executed by a processing element causes the processing element to perform acts according to any of the first, the second, the third, and the sixth embodiments. The aforementioned embodiment, wherein the processing element is included in a central computer. The aforementioned embodiment, wherein at least one of the remote processes is executed on at least one of a laptop computer, a desktop computer, a file server computer, and a workstation computer.

A ninth embodiment of a computer readable medium having a set of instructions stored therein which when executed by a processing element causes the processing element to perform acts according to the fourth or the fifth embodiments. The aforementioned embodiment, wherein the processing element is included in at least one of a laptop computer, a desktop computer, a file server computer, and a workstation computer. The aforementioned embodiment, wherein the requestor is a central computer.

System

FIG. 1 illustrates selected details of an embodiment of a system for efficiently analyzing a multiplicity of remote machines. The system includes Central Machine 102 enabled to communicate with Remote Machines 101 as illustrated by Communication Channels 103. The central machine is coupled to Media 104 for accessing Database 114 and Code 115 stored in the media. The media is any form of non-volatile storage, according to various embodiments, including magnetic, optical, and flash media. The central machine is any type of computer enabled to access the media and communicate with the remote machines, such as a workstation, desktop, or laptop type of computer. The communication channels are provided via any form of networking, such as any combination of LAN/MAN/WAN or the Internet, using any appropriate protocol (such as TCP/IP). The remote machines are illustrated according to computer type (Laptops 110, Desktops 111, and File Servers 112), and each type has a plurality of elements. All of the remote machines are enabled for communication with the central machine via a unique communication channel (as illustrated by communication elements 103.1-103.6 of Communication Channels 103).

In some embodiments, all or any portion of the remote machines are configured with a Win32 or a Win64 compatible OS (such as Windows XP or Windows Vista from Microsoft). The central machine is optionally configured similarly. The remote machines provide (by inclusion of local media such as an included hard disk or via attachment of external media such as a networked file appliance) one or more file systems having files accessible by processes executing on the remote machines. In some embodiments, the remote machines are all members of a defined group having associated defined privileges and/or responsibilities, such as at least one Windows domain. In some embodiments, membership in the Windows domain grants access to shared resources (such as one or more enterprise-class file systems implemented by any combination of a portion of the remote machines and other machines). In some embodiments, membership in the Windows domain indicates the remote machine is configured to accept a request to execute an RPC (such as provided by the central machine).

Operation

In operation the central machine directs the remote machines to perform local operations via a bootstrapped mechanism requiring few assumptions about the remote machines. In some embodiments, the remote machines are only assumed to be members of a Windows domain. The local operations optionally include analyzing the files in the file systems implemented by the remote machines (e.g. each remote machine analyzes files of the file system on a respective local hard disk of the respective remote machine). Thus all or a significant portion of the files of the remote machines are analyzed without transmission of data of the files over the communication channels. Instead results of the analysis are communicated. The remote machines are optionally directed to perform the local operations substantially in parallel with each other.

In some embodiments, the local operations begin by automatically determining if the remote machine is properly configured to perform the analysis. If the determining finds missing or out of date library code, then proper code is requested from the central machine, or alternatively from a widely accessible repository such as a web site via the Internet. For example, if the remote machine is lacking a proper installation of the .NET framework from Microsoft, then the remote machine obtains the proper code from the central machine or alternatively from a Microsoft web site. The proper code is then installed and initialized so that the remote machine is properly configured to perform the analysis.

The local operations optionally include calling back the central machine to obtain a program to execute after the remote machine has been found to be (or has been made to be) properly configured. The program is provided by the central machine, and in some embodiments, only a portion of the program is provided. If only a portion is provided, then as the remote machine executes the program and determines another portion (such as an assembly or module) of the program is needed, the needed portion is requested from the central machine (a so-called "lazy download" technique). The central machine provides the requested portion and the remote machine continues to execute the program, possibly including discovering one or more additional needed portions that are lazily downloaded.

In some embodiments, input to the program is provided via StdIn from the central machine. In some embodiments, results produced by the program (such as via StdOut and StdErr) are provided to the central machine. In some embodiments, results are stored in one or more temporary files implemented in a unique temporary directory on the remote machine. In various embodiments, all or any portions of the results are provided to the central machine. The central machine gathers the results from all of the remote machines and combines the results together.

After each remote machine completes execution of the program, all of the files generated by the program are deleted, and all processes created for execution of the program are destroyed, thereby removing all traces of the execution of the program. In some embodiments, the program is executed on the remote machine subject to other processing performed by the remote machine. For example, the program is optionally executed at a relatively low priority, or optionally with relatively fewer resources. For another example, the program is optionally executed only when execution cycles or I/O bandwidth would otherwise be unused.

Figure 2:
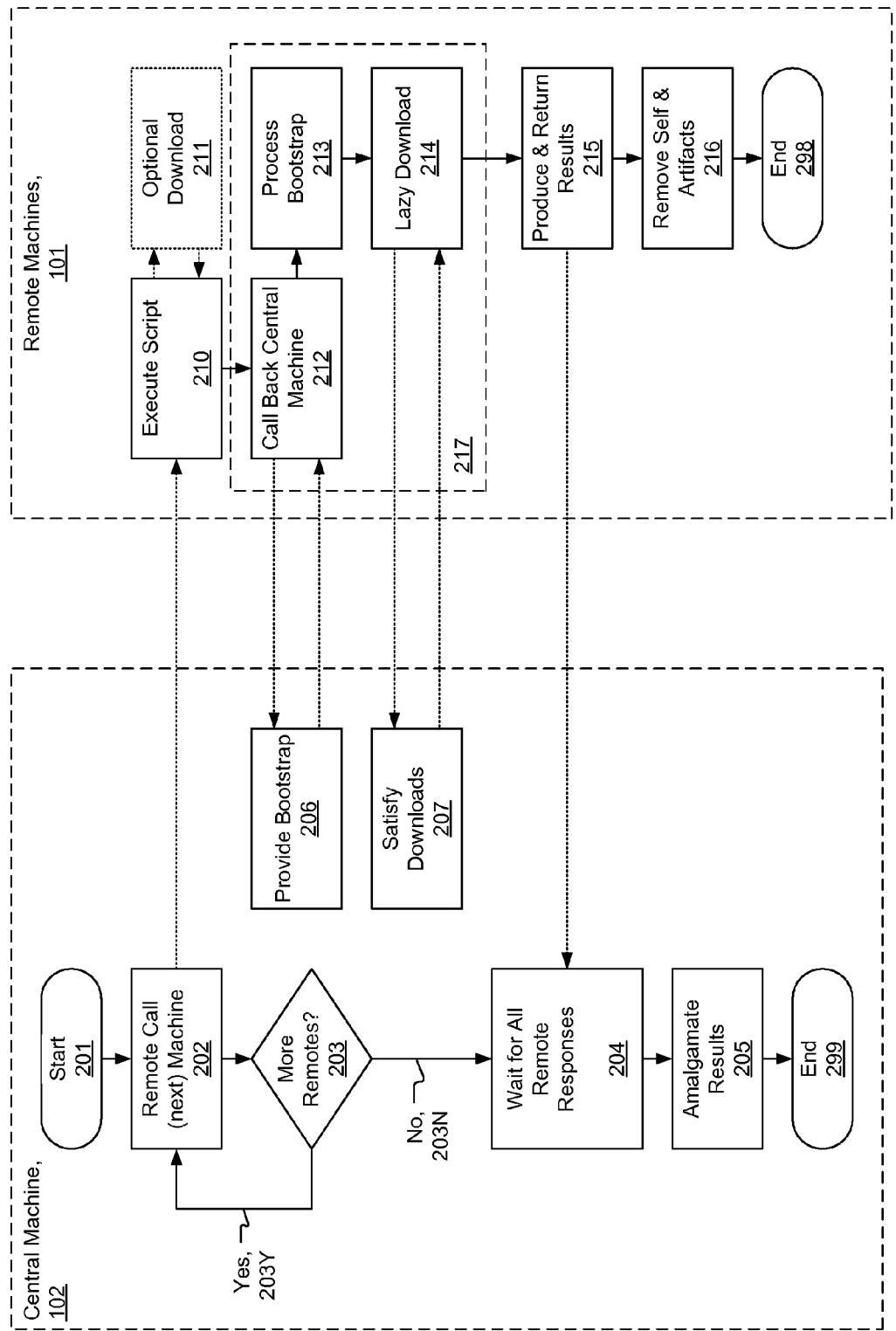
FIG. 2 illustrates selected details of processing relating to efficiently analyzing a multiplicity of remote machines.

FIG. 2 illustrates selected details of processing relating to efficiently analyzing a multiplicity of remote machines according to the system of FIG. 1. Dashed-boxes indicate actions performed by Central Machine 102 and each of the Remote Machines 101. Conceptually an instance of the actions shown inside Remote Machines 101 are performed independently and potentially in parallel on each of Laptop 110.1 . . . Laptop 110.N, Desktop 111.1 . . . Desktop 111.M, and FileServer 112.1 . . . FileServer 112.O of FIG. 1, while the actions shown inside Central Machine 102 are performed on Central Machine 102 of FIG. 1. In some embodiments, an ephemeral agent program implements processing resulting in the actions performed by the central machine, and the ephemeral agent program is optionally stored as a portion of Code 115 (of FIG. 1).

Processing begins ("Start" 201) on the central machine by initiating spawning a process on a (next) one of the remote machines ("Remote Call (next) Machine" 202). Flow continues to determine if any of the remote machines remain to be engaged ("More Remotes?" 203). If so, then processing loops back ("Yes" 203Y) to initiating spawning a next process on a next remote machine. If not, then processing flows forward ("No" 203N) and proceeds to wait for result information from the remote machines ("Wait for all Remote Responses" 204). When all of the remote machines have supplied results, then processing continues, where the results are combined together ("Amalgamate Results" 205). In some embodiments, all or any portion of the results are used to update Database 114 (of FIG. 1). Processing in the central machine is then complete ("End" 299). In some embodiments, processing according to "Amalgamate Results" 205 proceeds incrementally without waiting for all remote machines to provide results (e.g. results are processed as received).

An instance of processing as depicted in Remote Machines 101 is activated in response to the spawning request from the central machine ("Remote Call (next) Machine" 202). A script (from any combination of Database 114 and Code 115 of FIG. 1, for example) is provided by the central machine and is executed ("Execute Script" 210). The script optionally includes checking to determine if proper software elements are available on the remote machine. If not, then missing (or incorrect) elements are downloaded and installed ("Optional Download" 211). The download is optionally provided by any combination of the central machine (from any combination of Database 114 and Code 115 of FIG. 1, for example) and a central repository (not illustrated). In some embodiments, all required software elements are provided by the central machine with the script. In some embodiments, proper software elements are assumed to be available on the remote machine. If the elements are provided or are assumed to be available, then the checking is optionally omitted.

The remote machine processes the script, determines that the script includes a specification of a bootstrap to be provided by the remote machine, and requests the bootstrap from the central machine ("Call Back Central Machine" 212). The central machine responds to the request ("Provide Bootstrap" 206), and the remote machine proceeds to execute the provided bootstrap ("Process Bootstrap" 213). As the bootstrap is executed, the remote machine, in some usage scenarios, discovers one or more missing components. The missing components (if any) are dynamically requested as needed from the central machine ("Lazy Download" 214) and provided by the central machine in response ("Satisfy Downloads" 207). Any combination of the bootstrap and the missing components are optionally obtained from any combination of Database 114 and Code 115 (of FIG. 1). In some embodiments or usage scenarios, a plurality of missing modules are discovered sequentially, and a corresponding plurality of instances of "Lazy Download" 214 and "Satisfy Downloads" 207 result. In some embodiments, the bootstrap is fully complete as provided by the central machine, and there are no missing components (e.g. no lazy download requests). In various embodiments, the download requests include any combination of requests for code modules, code assemblies, data modules, and data assemblies.

The bootstrap (and any code provided in response to lazy download requests) is executed, results produced, and the results are provided to the central machine ("Produce and Return Results" 215). The results, according to various embodiments, are be returned via StdOut, StdErr, or both. One or more temporary files are created, in some embodiments, in a unique temporary directory associated with the execution of the bootstrap. All traces of the execution of the bootstrap are then removed from the remote machine ("Remove Self & Artifacts" 216), including destroying all processes for executing the bootstrap, and removing all files (such as the one or more temporary files) created by execution of the bootstrap. Processing in the remote machine is then complete ("End" 298).

In some embodiments, work performed on one of the remote machines (such as according to any of the actions depicted in Remote Machines 101) is performed in a self-monitoring and/or self-regulating fashion to interfere as little as possible with other operations being performed by the remote machine. For example, the self-monitoring optionally includes determining processor cycles used in comparison to cycles available (e.g. idle) and determining I/O bandwidth used in comparison to I/O bandwidth available for other operations. If resources used appear high enough to possibly appear interfering, then the self-regulating reduces priority of the work performed to reduce the interference.

In some embodiments, actions relating to the spawning of the process ("Remote Call (next) Machine" 202) correspond to making a Win32-style (or alternatively a Win-64 style) call to a CreateServe function provided by the remote machine. In various embodiments, actions relating to the spawning correspond to invoking a WMI function enabled to execute a script, a VBScript engine, or any similar script processing facility.

The spawned process is, in some embodiments, created as a Windows service having a pseudo-random name (such as the service name preceded by the GUID). The actions optionally include echoing an executable Jscript- (or VBScript-) compatible script that includes a request for the bootstrap.

In some embodiments, the bootstrap, when executed by the remote machine, causes the remote machine to inspect software installation and configuration information to determine if a correct version of the .NET framework and associated service packs are available on the remote machine (such as processing relating to "Optional Download" 211). If not, then installation scripts are downloaded from either of the central machine or a Microsoft download site and processed to install and configure the .NET framework.

In some embodiments, the bootstrap further causes the remote machine to call back the central machine to download an EXE file (such as processing relating to "Call Back Central Machine" 212). Optionally other associated files needed for initialization of the EXE file are downloaded from the central machine. In some embodiments, the EXE (and the other optional associated files, if any) are stored in a UNC folder such as \\remoteMachine\admin$\temp that is optionally exposed by Windows. The bootstrap then causes the remote machine to start up and execute the assembly (optionally as a child process) "assemblyToRun" as specified by the CreateService( ) call in the aforementioned script (as performed, for example, as part of "Process Bootstrap" 213). An event handler is added to an AppDomain_AssemblyUnresolved event portion of a runtime system used for execution of the assembly to respond to references in the assembly to objects that are not resolvable by the runtime system (such as to enable "Lazy Download" 214).

Missing assemblies result in invocation of the event handler enabling lazy downloading as needed during execution of the assembly. Operation is similar to DLLs, except loading is satisfied from the central machine (via one of Communication Channels 103 of FIG. 1, for example) rather than the remote machine (behaving as a local machine with respect to the assembly being executed). Note that in some embodiments and usage scenarios, the assembly is provided without any unresolved elements (e.g. the assembly is provided in its entirety).

Communication between the assembly and the central machine is via StdOut and StdErr, and optionally StdIn. Results are optionally stored in files created in a temporary directory that is unique to the specific instance of execution of the assembly. When complete, the assembly deletes all files it created (such as in \\remoteMachine\admin$\temp) and destroys itself and any associated or child processes.

Processing of elements enclosed by dashed-box 217 is optional, in various combinations, according to various embodiments. For example, in some embodiments, the script provided by the central machine and used in "Execute Script" 210, has an embedded executable binary that is echoed by the remote machine to be executed as a bootstrap, thus bypassing processing associated with "Provide Bootstrap" 206 and "Call Back Central Machine" 212. For another example, in some embodiments, the script is entirely self-contained, having an embedded executable binary and all of the modules referred to by the script, the embedded executable binary, or both, that are not already present on the remote machine. During processing associated with the entirely self-contained script, flow proceeds from "Execute Script" 210 directly to "Produce and Return Results" 215, as the call back, bootstrap processing, and lazy downloading are omitted.

Although the aforementioned embodiments are described with respect to a central machine initiating spawning of remote processes, supplying executables, and processing output, other embodiments are contemplated where the central machine is any computer enabled to execute programs and access networking facilities. The computer operates as a "master" computer with respect to the remote machines operating as "slave" computers, each performing operations under control of the master computer. Furthermore, more than one central machine, in some embodiments, controls operations of the remote machines. For example, a first portion of the remote machines is controlled by a first central machine, a second portion of the remote machines is controlled by a second central machine, and the two central machines optionally initiate spawning of remote processes (and so forth) on the two portions of remote machines wholly or partially in parallel.

Processing, such as analysis as performed by the repercussionless ephemeral agent, is not limited by any of the aforementioned description. For example, the agent, according to various embodiments, is used to invoke remote code to perform one or more of the following functions:

- run-time deployment of applications servers (for business logic, for example) to a selected set of remote machines;
- run-time deployment of web servers to a selected set of remote machines to perform administrative functions on Windows domain clients (such as run time installation of software);
- determine if specific files are stored on the remote machines without using UNC shares;
- create an on demand "peer computing grid" to solve large distributable problems (such as sorting a large file before importing into a database);
- force an immediate GPO update on the remote machines;
- determine if a specific user is logged into a console of a remote machine;
- force a user logout of a remote machine (such as for remote management of a kiosk); and
- scan files on the remote machines for sensitive content.

Conclusion

Certain choices have been made in the presentation of this disclosure merely for reasons of convenience in preparing the text and drawings and unless there is an indication to the contrary these choices of convenience should not be construed per se as conveying additional information regarding the structure of the embodiments illustrated. Illustrative examples of such choices of convenience include: the particular organization or assignment of the designations used for the figure numbering and the particular organization or assignment of the element identifiers (e.g., the callouts or numerical designators) used to identify and reference the features and elements of the embodiments.

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims of the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as the OS; specific function and parameter names; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (e.g., generally dedicated circuitry) or software (e.g., via some manner of programmed controller or processor), as a function of implementation dependent design constraints and the technology trends of faster processing (facilitating migration of functions previously in hardware into software) and higher integration density (facilitating migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims of the issued patent.

What is claimed is:
1. A method comprising:
   communicating via a central computer an executable script to two or more remote processes respectively executing on two or more remote computers;

communicating, via the central computer, an executable program to the remote processes in response to call backs resulting from execution of the executable script by the remote processes;

communicating, via the central computer, objects in response to object requests from the remote processes, the object requests resulting from execution of the executable program;

receiving, via the central computer, respective output from the remote processes;

wherein the executable script specifies the executable program;

wherein the executable program is an analysis program having at least one reference to each of the objects;

wherein at least one of the objects comprises keys that are results of linguistic analysis of content, the analysis program being enabled to use the keys to ascertain if the content is in files accessible to the analysis program while not enabling determination of the content from the keys alone;

wherein the executable script is compatible with and executable under control of a create service function that is compatible with an operating system of a particular type;

wherein the executable program is stored in a folder that is exposed by the operating system in accordance with a universal naming convention; and wherein the remote computers respectively host the remote processes, the central computer is a member of a particular domain, the domain being of the operating system, and the remote computers have each established a respective trust relationship with the central computer via joining the particular domain.

2. The method of claim 1, wherein the executable program is compatible with a software framework of the operating system.

3. The method of claim 1, wherein the create service function is either a 32-bit create service function of the operating system or a 64-bit create service function of the operating system.

4. The method of claim 1, further comprising spawning the remote processes on the respective remote computers.

5. The method of claim 1, wherein the central computer has a database repository comprising the executable script.

6. The method of claim 1, wherein at least one of the objects is a software module object and at least another one of the objects is a data module object.

7. The method of claim 1, wherein the analysis program is capable of categorizing information content in the files according to at least one of
 a personal information category,
 a financial information category,
 a public information category,
 a private information category,
 a proprietary information category,
 a sensitive information category, and
 a government regulated information category.

8. The method of claim 1, wherein the remote processes are executed with administrator privileges.

9. The method of claim 1, wherein the acts of communicating and the act of receiving are in cooperation with one or more analysis processes, and a first one of the analysis processes is performed at least partially in parallel with a second one of the analysis processes.

10. The method of claim 9, wherein the first and the second analysis processes are via distinct ones of the remote computers.

11. A method comprising:

responding, via spawning a process, to a request from a controlling computer to process an executable script;

requesting an analysis program from the controlling computer via a call back resulting from processing of the executable script;

executing the analysis program;

requesting, when the executing refers to one or more objects that are unavailable locally, the respective object from the controlling computer;

communicating output from the executing to the controlling computer;

wherein the executable script specifies the analysis program;

wherein at least one of the objects comprises keys that are results of linguistic analysis of content, the analysis program being enabled to use the keys to ascertain if the content is in files accessible to the analysis program while not enabling determination of the content from the keys alone;

wherein the executable script is compatible with and executable under control of a create service function that is compatible with an operating system of a particular type;

wherein the analysis program is stored in a folder that is exposed by the operating system in accordance with a universal naming convention; and wherein the controlling computer is a member of a particular domain, the domain being of the operating system, and the responding is performed by one or more members that have each established a respective trust relationship with the controlling computer via joining the particular domain.

12. The method of claim 11, wherein the process is ephemeral.

13. The method of claim 12, further comprising destroying the process.

14. The method of claim 13, further comprising destroying all child processes spawned by the process.

15. The method of claim 11, wherein the process is repercussionless.

16. The method of claim 15, further comprising removing all files created by the process.

17. The method of claim 11, wherein the analysis program is compatible with a software framework of the operating system.

18. The method of claim 11, wherein the create service function is either a 32-bit create service function or a 64-bit create service function of the operating system.

19. The method of claim 11, wherein the analysis program has modules to classify content of files accessible by the process according to a plurality of classifications.

20. The method of claim 19, wherein the classifications comprise:
 a personal information classification,
 a financial information classification,
 a public information classification,
 a private information classification,
 a proprietary information classification,
 a sensitive information classification, and
 a government regulated information classification.

21. The method of claim 11, wherein the executing is at an administrator privilege level.

22. The method of claim 11, wherein the executing is at an adjustable priority level.

23. The method of claim 22, wherein the adjustable priority level is dynamically modified according to availability of at least one of idle processor cycles and spare input/output bandwidth.

24. The method of claim 11, wherein the executing is via a controlled computer, and the controlled computer is one of a laptop computer, a desktop computer, a file server computer, and a workstation computer.

25. A system comprising:
   a computer having a networking interface;
   non-volatile storage coupled to the computer and having images stored therein of
      a control agent program,
      an executable script,
      an executable analysis program, and
      a collection of objects;
   wherein the executable analysis program has references to the objects;
   wherein the control agent program, when executed by the computer, causes the computer to perform functions comprising
      initiating spawning of a plurality of slave processes,
      communicating the executable script to all of the slave processes,
      communicating, in response to call backs arising from execution of the executable script by one or more of the slave processes, the executable analysis program to the slave processes,
      communicating, in response to object requests arising from execution of the executable analysis program by the slave processes, appropriate ones of the objects from the non-volatile storage, and
      receiving respective output data from each of the slave processes;
   wherein at least one of the objects comprises keys that are results of linguistic analysis of content, the analysis program being enabled to use the keys to ascertain if the content is in files accessible to the analysis program while not enabling determination of the content from the keys alone;
   wherein the executable script is compatible with and executable under control of a create service function that is compatible with an operating system of a particular type;
   wherein the analysis program is stored in a folder that is exposed by the operating system in accordance with a universal naming convention; and
   wherein the computer is enabled to become a member of a particular domain, the domain being of the operating system, and respective hosts of the slave processes are each enabled to establish a respective trust relationship with the computer via joining the particular domain.

26. The system of claim 25, wherein the executable analysis program is compatible with a software framework of the operating system.

27. The system of claim 25, wherein the create service function is either a 32-bit create service function or a 64-bit create service function.

28. The system of claim 25, wherein the output data has results of a file content analysis according to the executable analysis program of the operating system.

29. The system of claim 28, wherein the file content analysis is according to a plurality of file content categories comprising:
   a personal information category,
   a financial information category,
   a public information category,
   a private information category,
   a proprietary information category,
   a sensitive information category, and
   a government regulated information category.

30. The system of claim 25, wherein the computer operates as a master computer and each of the slave processes is to execute on a respective slave computer.

31. The system of claim 30, wherein one of the slave computers is at least one of a laptop computer, a desktop computer, a file server computer, and a workstation computer.

32. The system of claim 30, further comprising the slave computers.

* * * * *